US005636660A

United States Patent [19]

Pfleiderer et al.

[11] Patent Number: 5,636,660

[45] Date of Patent: Jun. 10, 1997

[54] DEVICE FOR TRANSFERRING AND DRAWING LIQUIDS

[75] Inventors: Klaus Pfleiderer, Frankfurt am Main; Peter Heise, Fuldabrück, both of Germany

[73] Assignee: CareMed GmbH, Rotenburg/Fulda, Germany

[21] Appl. No.: 428,274

[22] Filed: Apr. 25, 1995

[30] Foreign Application Priority Data

Apr. 27, 1994 [DE] Germany .......................... 44 14 697.3

[51] Int. Cl.[6] .......................... F16L 37/28

[52] U.S. Cl. .......................... 137/550; 137/588; 251/149.5; 604/414

[58] Field of Search .......................... 604/405, 414, 604/248, 905; 251/149.6; 137/550, 588; 141/330

[56] References Cited

U.S. PATENT DOCUMENTS

| | | | |
|---|---|---|---|
| 3,938,520 | 2/1976 | Scislowicz et al. | 604/405 |
| 4,576,199 | 3/1986 | Svensgon et al. | 251/149.5 |
| 4,834,152 | 5/1989 | Howson et al. | 604/414 |
| 5,098,407 | 3/1992 | Okamura | 604/248 |

FOREIGN PATENT DOCUMENTS

| | | | |
|---|---|---|---|
| 475761 | 9/1969 | Germany | 604/414 |
| 3627231 | 2/1988 | Germany . | |
| 3820204 | 12/1989 | Germany . | |
| 4010202 | 10/1991 | Germany . | |
| 4122221 | 9/1993 | Germany . | |

*Primary Examiner*—A. Michael Chambers
*Attorney, Agent, or Firm*—Collard & Roe, P.C.

[57] ABSTRACT

A device for transferring and withdrawing liquids or liquid media from bottles, pouches or similar containers for medical purposes. The device includes a first rotationally-symmetric body including a threaded cam, a first spike with a tip, a first main duct extending to the tip, and a first auxiliary duct extending to the tip. The first auxiliary duct narrows to a capillary-like opening adjacent to the tip. A second rotationally-symmetric body is provided which includes a second spike with a second main duct and a second auxiliary duct. The first body is centrically plugged into the second body wherein the first spike is diametrically disposed with respect to the second spike. The first and second main ducts form a substantially linear, axially extending flow path through the device. The first and second bodies include a recess formed between the first auxiliary duct and the second auxiliary duct. A separate filter housing is connected to the threaded cam of the first body following the removal of the second body. A sealing surface on the filter housing is sealed against the first body with the filter of the filter housing disposed transverse to the axially extending flow path.

13 Claims, 5 Drawing Sheets

DEVICE FOR TRANSFERRING AND DRAWING LIQUIDS

BACKGROUND OF THE INVENTION

1. Field of the Invention

The present invention relates to a device for transferring and drawing liquids from bottles, pouches or similar containers for medical purposes. The device includes two piercing pins oppositely disposed in one axis with two flow ducts being present in each of the pins.

2. Prior Art

Various devices for the transfer and withdrawal of liquids from bottles or pouches for medical purposes are known, which contain at least two flow ducts and one or two filters. For example, DE 3627231 A1 describes a transfer device for mixing medications contained in different containers. The patented device consists of two spikes directed in opposite directions and connected together with each spike being provided with a through-extending liquid duct and a venting duct. The device is characterized by two components connected with each other, whereby each component is fitted with a spike and the liquid ducts are connected with one another in the coupled condition, whereas each venting spike ends in a venting opening. The device is not only complicated with respect to its manufacture and handling, but also has the drawback that two air filters are required. Furthermore, it is not possible to store the remaining liquid to be used in the supply container in a sealed condition.

Furthermore, a device for the filtered feeding or withdrawal of liquid into or from a container, in particular a bottle is described in DE 3820201A1. Separate chambers for the liquid duct and the air duct are arranged in a support plate. Each duct contains a filter element. The device has the drawback of complicated manufacture and handling. Furthermore, a higher flow resistance is present, which requires a long period of time for drawing the media. Therefore, this device is suitable only for drawing liquids, but not as a transfer spike.

DE 4122221 A1 describes a transfer and withdrawal spike, in connection with which a support plate is fitted with piercing pins arranged diametrically to each other. Two flow ducts extend through each pin. Each flow duct includes a closing element which, in an open position, releases the flow through the duct, and, in a closed position, shuts off the flow through the duct. In the closed position, a duct for withdrawing liquid is communicatively connected with a section of the flow duct which is open toward an insertion syringe, and the duct for withdrawing liquid feeds into a short connection tube.

This device is not only complicated in terms of its manufacture, but also with respect to its operation and functional safety. Furthermore, serious sealing problems between the support plate and the closing element have to be expected during the manufacture and handling. In this case too, sealing of the bottle containing the remaining liquid is possible only at great expenditure.

Finally, a withdrawal spike is described in DE 4010202 A1, which consists of a support plate and a piecing pin. The pin forms one constructional unit with a short connection tube where a filter element is joined by welding with the support plate within the zone of the inlet opening. Such a device only permits withdrawal, but no transfer.

SUMMARY OF THE INVENTION

It is, therefore, an object of the present invention to overcome the drawbacks of the prior art and to provide a device for transferring and drawing liquid from containers which allows rapid mixing of two media.

It is a further object of the present invention to provide such a device for storing residual amounts of liquids.

It is yet another object of the present invention to provide such a device which permits the controlled withdrawal of partial amounts of liquid.

It is yet another object of the present invention to provide such a device which consists of a few small lightweight component which are environmentally safe.

These and other related objects are achieved according to the invention by a device for transferring and drawing liquids from containers. The device includes a first and second rotationally-symmetric body. The first body includes a threaded cam, a first spike with a tip, a first main duct extending to the tip, and a first auxiliary duct extending to the tip. The first auxiliary duct narrows to a capillary-like opening adjacent to the tip. The second body includes a second spike with a second main duct and a second auxiliary duct. The bodies include a first section with a first diameter and a second section with a second diameter smaller than the first diameter. The first body is centrically plugged into the second body wherein the first spike is diametrically disposed with respect to the second spike. The first and second main ducts form a substantially linear, axially-extending flow path through the device. The first and second bodies include a recess formed between the first auxiliary duct and the second auxiliary duct. A separate filter housing is provided with a top part, a bottom part, a sealing surface and a filter. The filter housing is connected to a threaded cam of the first body following removal of the second body. The sealing surface is sealed against the first body with the filter disposed transverse to the axially-extending flow path.

The first and second sections are cup-shaped, i.e. have a U-shaped axial cross section. The first section includes a cylindrical guide and seal, and the second section of the first body includes an interior surface with a conical guide and seal disposed on the interior surface. The device further includes an air filter and a recess communicating with the first auxiliary duct. The air filter is arranged in a radial direction within the first section of the first body.

The device further includes a radially-extending slanted plane with a 90° range of rotation disposed on the second section of the second body. The threaded cam is disposed at the second section of the first body for demountably coupling with the slanted plane. Alternatively, several snap hooks are symmetrically distributed across the circumference of the first section for positively connecting the bodies together.

The spikes include axially extending ribs or lamellae positioned along the circumferential surface of the spike. The ribs prevent rotation of the spike. Alternatively, the spike may be designed with a non-circular cross section to prevent rotation thereof. At the bottom part of the filter housing, a connection element, for example a threaded cam, is provided for connection to a conventional syringe or infusion line. Alternatively, a protected cap could be attached to seal and store any residual liquid. The protective cap is optionally connected with a flexible element to one of the bodies. The protective cap may also be used to cover one or both of the spikes.

The device additionally includes a further flow duct and an air filter in communication with the auxiliary flow ducts. A cam, a cover and a pivotally mounted plug are provided for hermetically sealing the further flow duct. Alternatively, the further flow duct is sealed with a sealing plug, a threaded sealing element, or a check valve. As an alternative to the capillary-like opening, the first auxiliary duct may be sealed with a sealing flap, a sealing valve or a sealing filter. As an alternative to the separate filter housing, a filter element may be welded directly onto the second section of the first body.

The solution according to the invention has a number of decisive advantages. For example, it is possible to dissolve a mostly toxic dry substance with a liquid in a closed system without discharging aerosols into the ambient air to avoid hazard to the user or patient. Venting of the containers during the transfer is liquid is possible in a simple way. Following mixing, withdrawing of the solution by means of a syringe or infusion line, the latter having an integrated drip chamber, is possible after the smaller rotationally-symmetric body has been separated from the larger one. A special advantage is that the two containers can be separated by one single manipulation, so that the container holding the usable solution is then available separately.

The device according to the invention can be simply and inexpensively manufactured. It has a small volume and consequently produces little waste material. Furthermore, it can be easily handled, which is a great advantage in clinical applications. Owing to the unit or modular construction system, the invention simultaneously provides a transfer set and a simple spike for drawing a solution from a container, with safe closure of the container and thus safe storage of quantities of solution not needed. Turning one of the rotationally-symmetric bodies permits a quick and simple separation of the two containers. Such simple and safe handling is made possible because the spikes are secured against turning in the rubber-elastic plugs of the containers.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
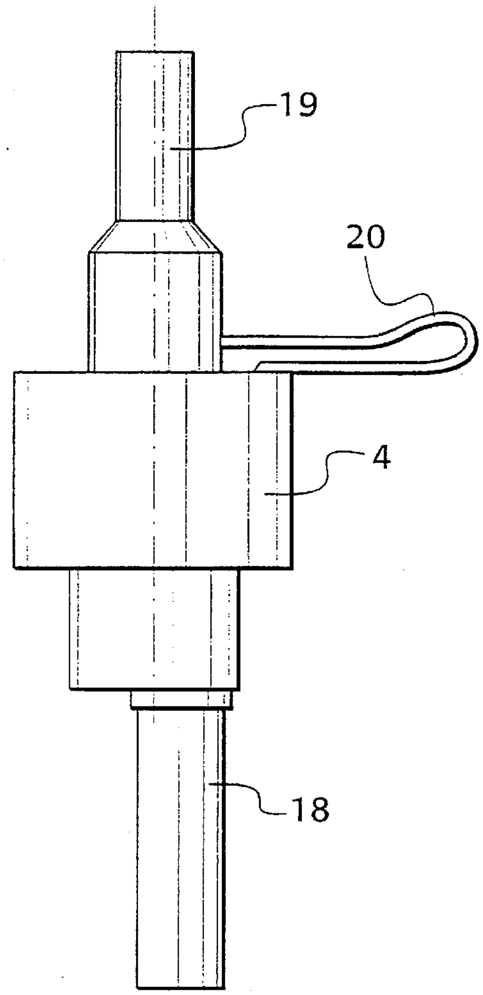
FIG. 1 is a side-elevational view of the device according to the invention with protective caps installed at opposite ends.

Turning now in detail to the drawings, the present invention is shown which consists of a modular system which is used or intended for all parts. In addition, the invention involves the rotationally-symmetric design of all individual parts, permitting simple manufacture, assembly and dismantling with low labor and material costs. FIG. 1 shows a general view of the device according to the invention. The sectional representations according to FIGS. 2 to 5*a* illustrate other important features of the invention. Two diametrically opposed spikes 1 and 2, which are rotationally-symmetric, are joined by the rotationally-symmetric bodies 3 and 4, respectively, which form one physical unit with spikes 1 and 2, respectively. The two rotationally-symmetric bodies 3 and 4 are adapted to be centrically plugged into one another. Body 4 extends over the exterior of rotationally-symmetric body 3. Both bodies 3 and 4 are cup-shaped with a U-shaped cross section and are provided along the longest diameter with a ring-shaped guide and seal 5. A cone-shaped guide and seal 6 are also provided on the opposite end of the two rotationally-symmetric bodies 3 and 4. Each body 3 and 4 has a first section with a longer diameter, and a second section with a shorter diameter. Guide and seal 5 is provided along the exterior of body 3 at the first section and guide and seal 6 is provided along the interior of body 3 at the second section.

Figure 6A:
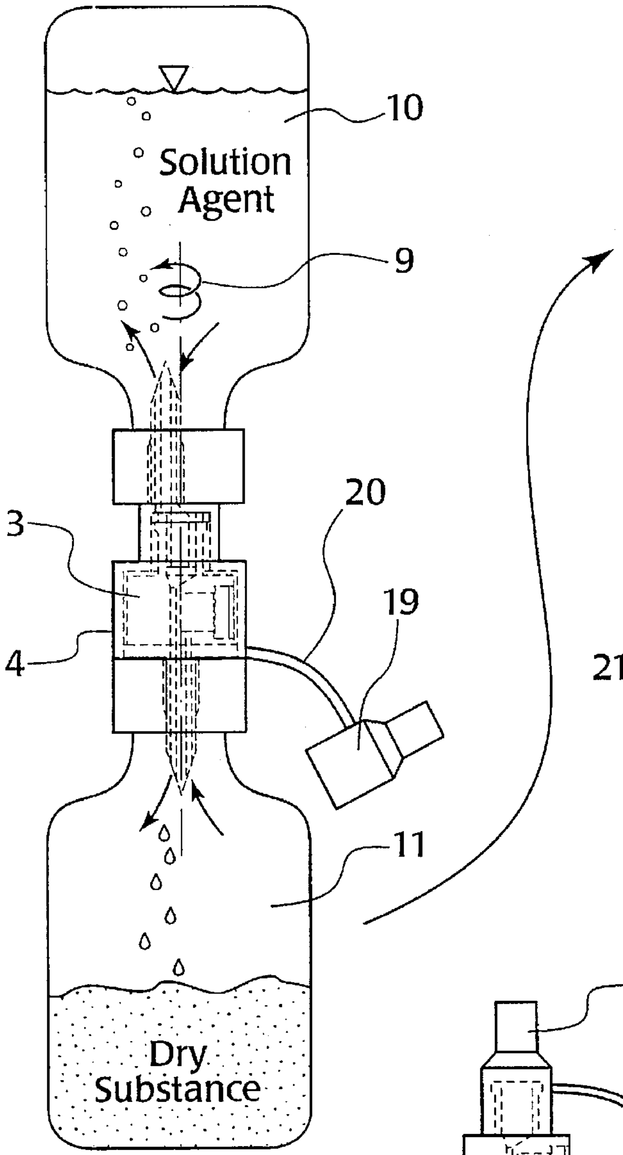
FIG. 6*a* is a side elevational view of two containers containing the starting substances.
Figure 6B:
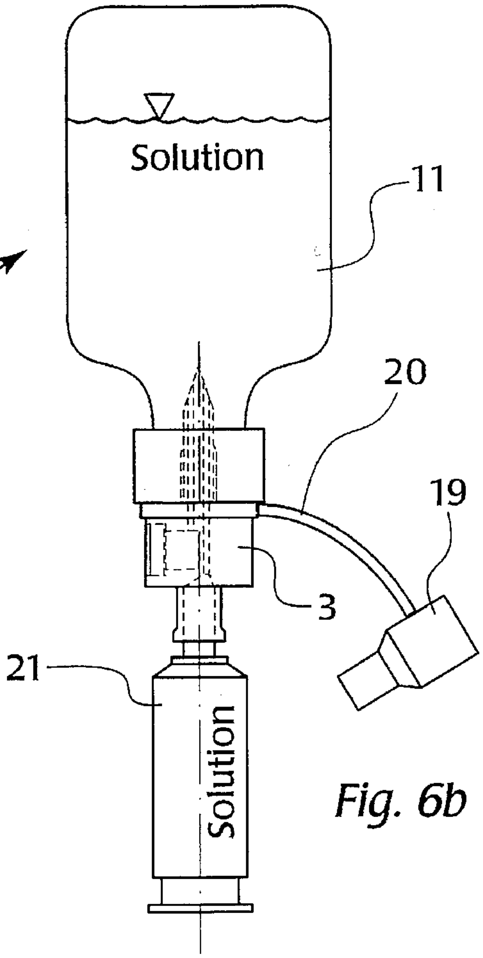
FIG. 6*b* is a side elevational view showing a connected syringe for drawing the solution, without filtration.

By virtue of said construction, the two rotationally-symmetric bodies 3 and 4 are centered and sealed against each other. To facilitate detachments, two to three threaded cams 7 are advantageously arranged at the lower end of the smaller rotationally-symmetric body 3 distributed across its circumference. Upon rotation of the two rotationally-symmetric bodies 3 and 4, cams 7 slide 90° across slanted planes, thereby producing a rotary stroke movement for separating the connection. The rotatability is characterized in FIG. 2*b* by the arrow 9. Two flow ducts **12*a* and 13*a*, and 12*b* and 13*b* are arranged in each of the spikes 1 and 2, respectively. The flow ducts 12*a* and 12*b* are arranged in such a way that they practically form an axial passage in the device according to the invention. It is possible, for example, for a liquid medium to flow from the bottle 10 into the bottle 11** without additional flow resistances, as shown in FIG. 6*a*. Instead of bottles 10, 11, other containers or syringes or infusion lines known for medical purposes can be used as well. The connection of the flow ducts **13*a* and 13*b* is established via an annular gap-shaped recess 14 formed between the rotationally-symmetric bodies 3 and 4**.

In order to account for air or gas filtration when media are exchanged between bottles 10 and 11, a recess 15, for example a bore, is arranged at the end of flow duct **13*a* perpendicular to the longitudinal axis. Recess 15 communicates with a recess 14 through an air filter 16**, the latter being known per se.

Figure 2A:
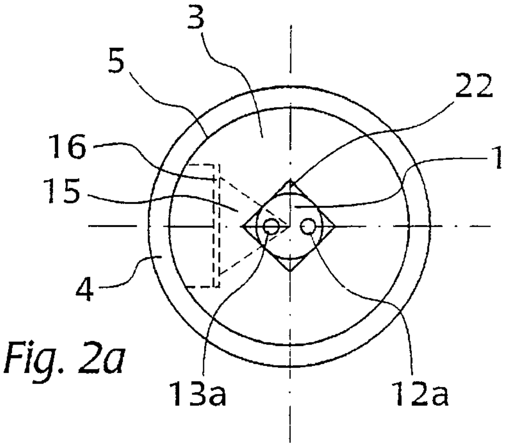
FIG. 2*a* is a top plan view of the device.
Figure 2C:
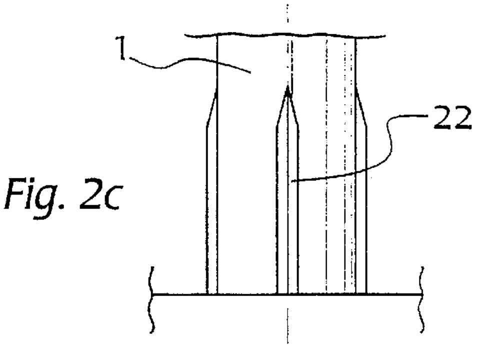
FIG. 2*c* is a side-elevational view of the ribs on the spikes for preventing rotation.
Figure 2B:
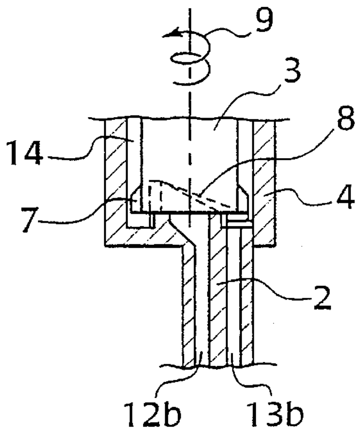
FIG. 2*b* is a cross-sectional view of the separation mechanism.
Figure 3:
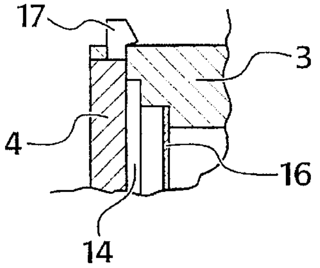
FIG. 3 is a cross-sectional view of the snap hooks.
Figure 4:
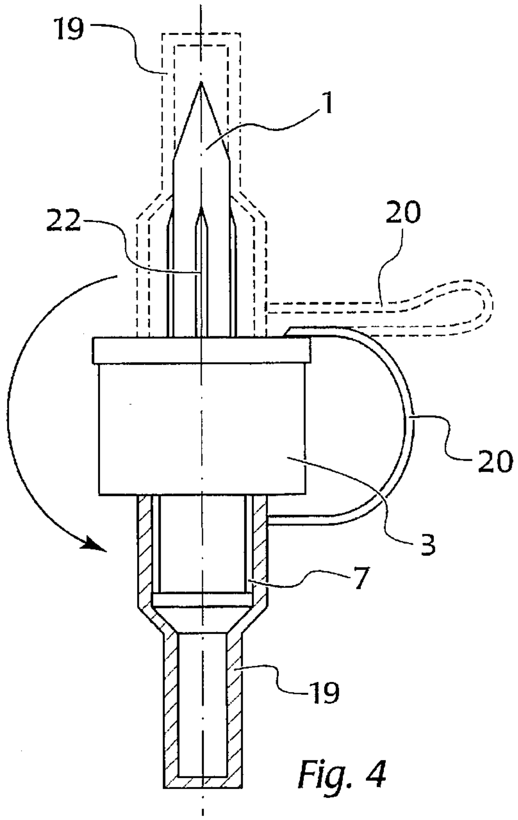
FIG. 4 is a side elevational view, in part in cross-section, of the protective cap in two positions.

FIG. 3 shows an additional or alternative force-locked connection between rotationally-symmetric bodies 3 and 4 provided by snap hooks 17, which are arranged on the circumference of the larger rotationally-symmetric body 4, and which project onto the circular surface of the rotationally-symmetric body 3. For protecting the spikes prior to use of the device, said spikes are covered with the protective caps 18 and 19. While the protective cap 18 is directly mounted, the protective cap 19 is connected with the device according to the invention via a flexible connection element 20. Following separation of the device, it is possible with the protective cap 19—which is pushed over the threaded cams 7—to store the remaining solution in the bottle 11. Via a syringe 21, a portion of the solution can then be drawn out at any time. For securing the spikes 1 and 2 against rotation in the rubber-like closures of the bottles 10 and 11, the spikes are designed with an oval or other non-rotationally-symmetric shape. Alternatively, ribs 22 are distributed over the circumference of the spikes and extend in the longitudinal direction, as can be seen in FIG. 2*c*.

Figure 5:
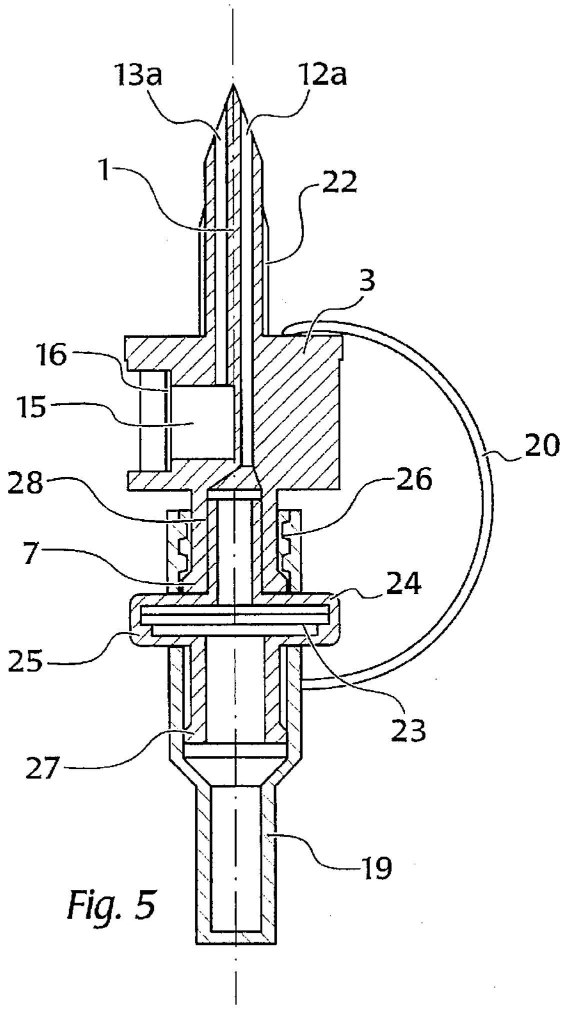
FIG. 5 is an axial cross-sectional view of a further embodiment of the device with a built-in, two-part filter housing and a protective cap.

FIG. 5 shows another embodiment having a modular construction. After the solution has been transferred from bottle 10 into bottle 11, bottle 10 and the larger rotationally-symmetric body 4 are jointly separated from the smaller rotationally-symmetric body 3. A filter housing is mounted on the smaller rotationally-symmetric body 3 via the threaded cam 7 and a thread 26 present on the filter housing attachment. The filter housing consists of a top part 24, a bottom part 25, and a filter 23 arranged transversely to the direction of flow, and known per se. A sealing surface 28 is produced via a conical attachment engaging the end of the smaller rotationally-symmetric body 3. Via a threaded cam 27 matching the cam 7, it is possible to connect a syringe 21 and to draw the contents of bottle 11 through the filter.

Figure 5A:
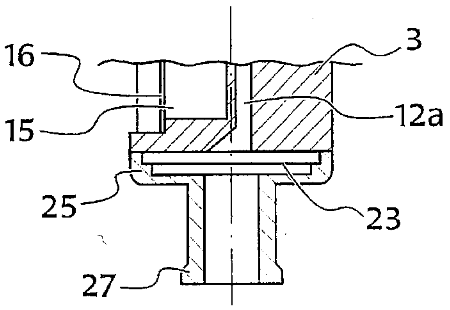
FIG. 5*a* is a cross-sectional view of a variation for mounting the bottom part of the filter housing on the smaller rotationally-symmetric body.

FIG. 5*a* shows the smaller rotationally-symmetric body 3 equipped for withdrawing liquids or solutions through a filter. Filter 23 is connected to bottom part 25 of the filter housing, for example by welding.

Figure 2:
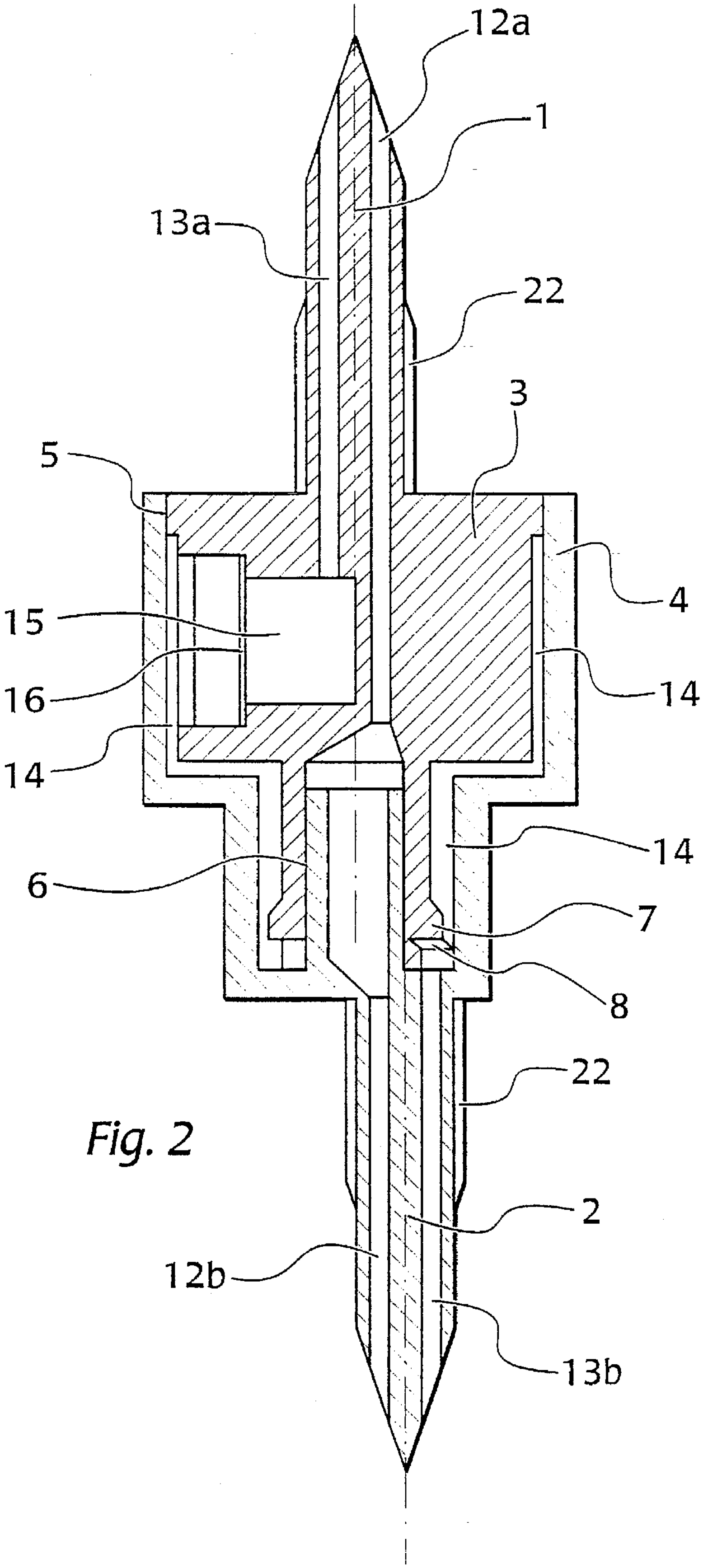
FIG. 2 is an axial cross-sectional view of the device according to the invention without the protective caps.
Figure 2D:
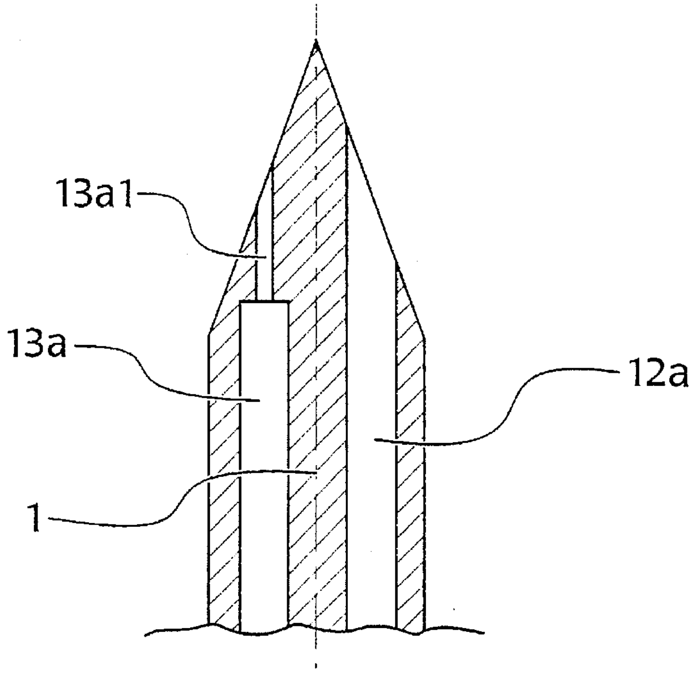
FIG. 2*d* is a cross-sectional view of a narrowing of the flow duct in the spike.

It has been found that the transfer of liquid from bottle 10 to bottle 11 is generally too slow when the device is used as a transfer spike (see FIGS. 2 and 5*a*). This is because the exchange of air from bottle 11 to bottle 10 via the air filter 16 meets with excessive resistance due to the relatively low difference in pressure.

Figure 2E:
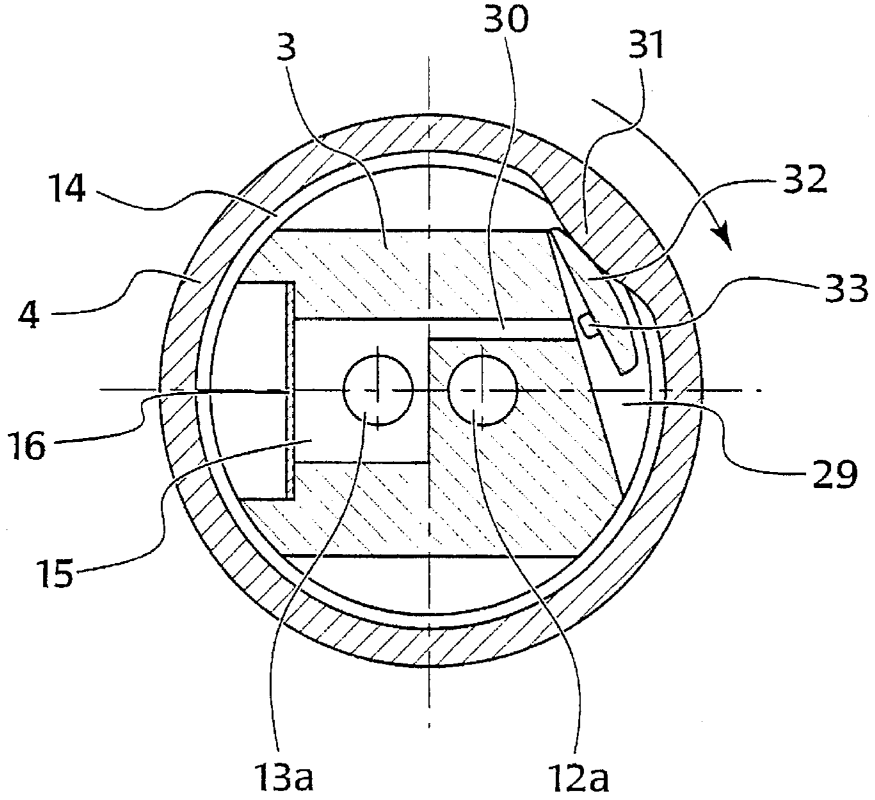
FIG. 2*e* is a cross-sectional view of an alternate embodiment of the device for accelerating the liquid exchange during transfer.

Since the rotationally-symmetric bodies 3 and 4 do not permit any exchange of air between the interior space and the ambient air through the area seals 5 and 6, the exchange of air can be usefully accomplished also in a way other than via the air filter 16, see FIG. 2*e*. The air from bottle 11 can pass into bottle 10 not only via the recess 14, the air filter 16, the recess 15 and the flow duct 13*a*, but can also directly pass to the bottle 10 from the recess 14 via recess 29, the flow duct 30 and to the recess 15, and from the latter via the flow duct 13*a* into the bottle 10.

After the transfer of liquid has been completed, the rotationally-symmetric bodies 3 and 4 are separated from each other by a turning movement via the slanted planes 8. During such movement, the cam 31 forces the cover 32 closed and the plug 33 hermetically seals the flow duct 30. The rotary motion should, in this connection, sweep through an angle of 30° to 45°.

Figure 6C:
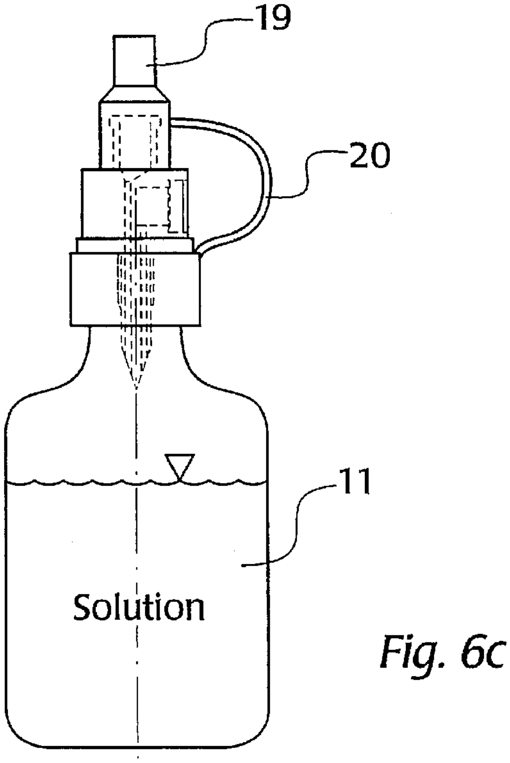
FIG. 6*c* is a side elevational view of a sealed bottle intended for storing.

Upon separation of the rotationally-symmetric bodies 3 and 4 from each other, an exchange of gas can take place only via the air filter 16, as shown in FIG. 6*c*. Instead of the cover 32 with the plug 33 it is possible also to use another pluggable closure for the flow duct 30, which closure can be present in another location of the rotationally-symmetric body 3 as well. Also, the flow duct 30 can be closed via a non-return valve or by some other measure.

Furthermore, it has been found that it is useful if the flow duct 13*a* is narrowed like a capillary at the tip of the spike 1. In this way, a directed flow is obtained, and entry of liquid is prevented. A narrowing 13*a*1 of one to ten millimeters in length and a diameter of preferably 0.2 to 0.6 millimeter has been found to be particularly advantageous. Instead of the narrowing 13*a*1 it is possible also to use a flap, a valve or some other suitable device.

While several embodiments of the present invention have been shown and described, it is to be understood that many changes and modifications may be made thereunto without departing from the spirit and scope of the invention as defined in the appended claims.

What is claimed is:

1. A device for transferring and drawing liquids from containers, comprising:

a first rotationally-symmetric body including a threaded cam, a first spikes, a first main duct, a first auxiliary duct and sealing means for sealing said first auxiliary duct, a second rotationally-symmetric body including a second spike with a second main duct and a second auxiliary duct, said bodies including a first section with a first diameter and a second section with a second diameter smaller than said first diameter, said first body being plugged into said second body wherein said first spike is diametrically opposed to said second spike and said first and second main ducts form a substantially linear, axially-extending flow path through the device, said first and second bodies including a recess formed between said first auxiliary duct and said second auxiliary duct; and a filter housing with a top part, a bottom part, a sealing surface and a filter, said filter housing being connected to said threaded cam of said first body following removal of said second body with said sealing surface being sealed against said first body so that said filter disposed transverse to the axially-extending flow path.

2. The device of claim 1, wherein said sealing means comprises a sealing element selected from a group consisting of a sealing flap, a sealing valve and a sealing filter.

3. A device for transferring and drawing liquids from containers, comprising:

a first rotationally-symmetric body including a threaded cam, a first spike with a tip, a first main duct extending to said tip and a first auxiliary duct extending to said tip, said first auxiliary duct narrowing to a capillary-like opening adjacent said tip, a second rotationally-symmetric body including a second spike with a second main duct and a second auxiliary duct, said bodies including a first section with a first diameter and a second section with a second diameter smaller than said first diameter, said first body being centrically plugged into said second body wherein said first spike is diametrically disposed with respect to said second spike and said first and second main ducts form a substantially linear, axially-extending flow path through the device, said first and second bodies including a recess formed between said first auxiliary duct and said second auxiliary duct; and a filter element welded onto said second section of said first body.

4. A device for transferring and drawing liquids from containers, comprising:

a first rotationally-symmetric body including a threaded cam, a first spike with a tip, a first main duct extending to said tip and a first auxiliary duct extending to said tip, said first auxiliary duct narrowing to a capillary-like opening adjacent said tip, a second rotationally-symmetric body including a second spike with a second main duct and a second auxiliary duct, said bodies including a first section with a first diameter and a second section with a second diameter smaller than said first diameter, said first body being centrically plugged into said second body wherein said first spike is diametrically disposed with respect to said second spike and said first and second main ducts form a substantially linear, axially-extending flow path through the device, said first and second bodies including a recess formed between said first auxiliary duct and said second auxiliary duct; and a filter housing with a top part, a bottom part, a sealing surface and a filter, said filter housing being connected to said threaded cam of said first body following removal of said second body, said sealing surface being sealed against said first body with said filter disposed transverse to the axially-extending flow path.

5. The device of claim 4, wherein said first and second sections are cup-shaped;

said first section comprises a cylindrical guide and seal;

said second section of said first body comprises an interior surface with a conical guide and seal disposed on said interior surface.

6. The device of claim 4, comprising an air filter and a recess communicating with said first auxiliary duct, said filter is arranged in the radial direction within said first section of said first body.

7. The device of claim 4, comprising a radially-extending, slanted plane with a 90° range of rotation disposed on said second section of said second body, wherein said threaded cam is disposed at said second section of said first body for demountably coupling with said slanted plane.

8. The device of claim 4, comprising several snap hooks symmetrically distributed across the circumference of said first section for positively connecting said bodies together.

9. The device of claim 4, wherein said spikes include axially-extending ribs positioned along the circumference thereof to prevent rotation of said spikes.

10. The device of claim 4, comprising a protective cap and a connection element flexibly connecting said protective cap to one of said bodies, said protective cap covering one of said spikes.

11. The device of claim 4, comprising:

a further flow duct and an air filter in communication with said auxiliary flow ducts, and a cam, a cover and a pivotally-mounted plug for hermetically sealing said further flow duct.

12. The device of to claim 4, comprising a further flow duct in communication with said auxiliary flow ducts, and sealing means for hermetically sealing said further flow duct.

13. The device of claim 12, wherein said sealing means is selected from a group consisting of a sealing plug, a threaded sealing element, and a check valve.

* * * * *